US011725353B2

(12) United States Patent
Johnson et al.

(10) Patent No.: US 11,725,353 B2
(45) Date of Patent: Aug. 15, 2023

(54) WORK BASKET WITH LIFT PLATFORM FOR DEPLOYING AND RETRIEVING HIGHWAY PANELS

(71) Applicant: J-Tech, Inc., Chester Springs, PA (US)

(72) Inventors: Richard S. Johnson, Pottstown, PA (US); Collin E. Johnson, Pottstown, PA (US); Jason M. Rohrer, Reading, PA (US)

(73) Assignee: Betts Platinum Group, LLC, Chester Springs, PA (US)

( * ) Notice: Subject to any disclaimer, the term of this patent is extended or adjusted under 35 U.S.C. 154(b) by 979 days.

(21) Appl. No.: 16/415,710

(22) Filed: May 17, 2019

(65) Prior Publication Data

US 2019/0352156 A1 Nov. 21, 2019

Related U.S. Application Data

(60) Provisional application No. 62/672,994, filed on May 17, 2018.

(51) Int. Cl.
*E01F 9/70* (2016.01)
*B60P 1/44* (2006.01)
*B66F 7/28* (2006.01)
*B66F 11/04* (2006.01)

(52) U.S. Cl.
CPC .............. *E01F 9/70* (2016.02); *B60P 1/4421* (2013.01); *B60P 1/4485* (2013.01); *B66F 7/28* (2013.01); *B66F 11/04* (2013.01)

(58) Field of Classification Search
CPC ......... E01F 9/70; B60P 1/4421; B60P 1/4485; B60P 1/4492

USPC ............................................ 404/73; 414/434
See application file for complete search history.

(56) References Cited

U.S. PATENT DOCUMENTS

| 1,280,090 | A | * | 9/1918 | Schrottky | B60P 1/4421 414/545 |
| 4,655,667 | A | * | 4/1987 | Plumb | A01D 46/243 414/535 |
| 5,213,464 | A | | 5/1993 | Nicholson et al. | |
| 5,755,309 | A | * | 5/1998 | Harman | B60P 1/4421 414/921 |

(Continued)

FOREIGN PATENT DOCUMENTS

| EP | 0500474 A1 | * | 8/1992 | ............... E01F 9/70 |
| GB | 2421975 A | * | 7/2006 | ............... E01F 9/70 |
| GB | 2538100 A | * | 11/2016 | ........... B60P 1/4421 |

*Primary Examiner* — James Keenan
(74) *Attorney, Agent, or Firm* — Miller Law Group, PLLC

(57) ABSTRACT

A highway work basket apparatus includes a vertically movable lift platform that can be selectively mounted on either side of the work basket. The frame of the work basket supports a pair of lift mechanisms mounted on opposing sides at the forward end of the work basket. A detachable lift platform is provided for selective attachment to one of the opposing lift mechanism to enable movement of highway markers between the levels of the truck bed and the surface of the highway. The floor of the lift platform has conveyors embedded therein and powered by the hydraulics of the highway truck on which the work basket is mounted to facilitate the movement of the highway markers onto or off of the surface of the highway. The frame of the work basket also supports a hitch receiver to permit a trailing attachment of a directional sign.

17 Claims, 5 Drawing Sheets

(56) References Cited

U.S. PATENT DOCUMENTS

| | | | | |
|---|---|---|---|---|
| 6,056,498 | A | 5/2000 | Velinsky et al. | |
| 7,306,398 | B2 | 12/2007 | Doran, Jr. | |
| 8,177,471 | B2 * | 5/2012 | Nespor | B60P 3/055 |
| | | | | 414/544 |
| 8,979,465 | B2 * | 3/2015 | Brown | E01F 9/70 |
| | | | | 414/518 |
| 9,056,572 | B2 * | 6/2015 | Hemphill | E01F 9/70 |
| 10,195,978 | B2 * | 2/2019 | Johnson | B60P 1/4485 |
| 10,196,003 | B2 * | 2/2019 | Johnson | E01F 9/70 |
| 2009/0097914 | A1 * | 4/2009 | Flynn | E01F 9/70 |
| | | | | 404/9 |
| 2017/0362786 | A1 * | 12/2017 | Betson | E01F 9/654 |

* cited by examiner

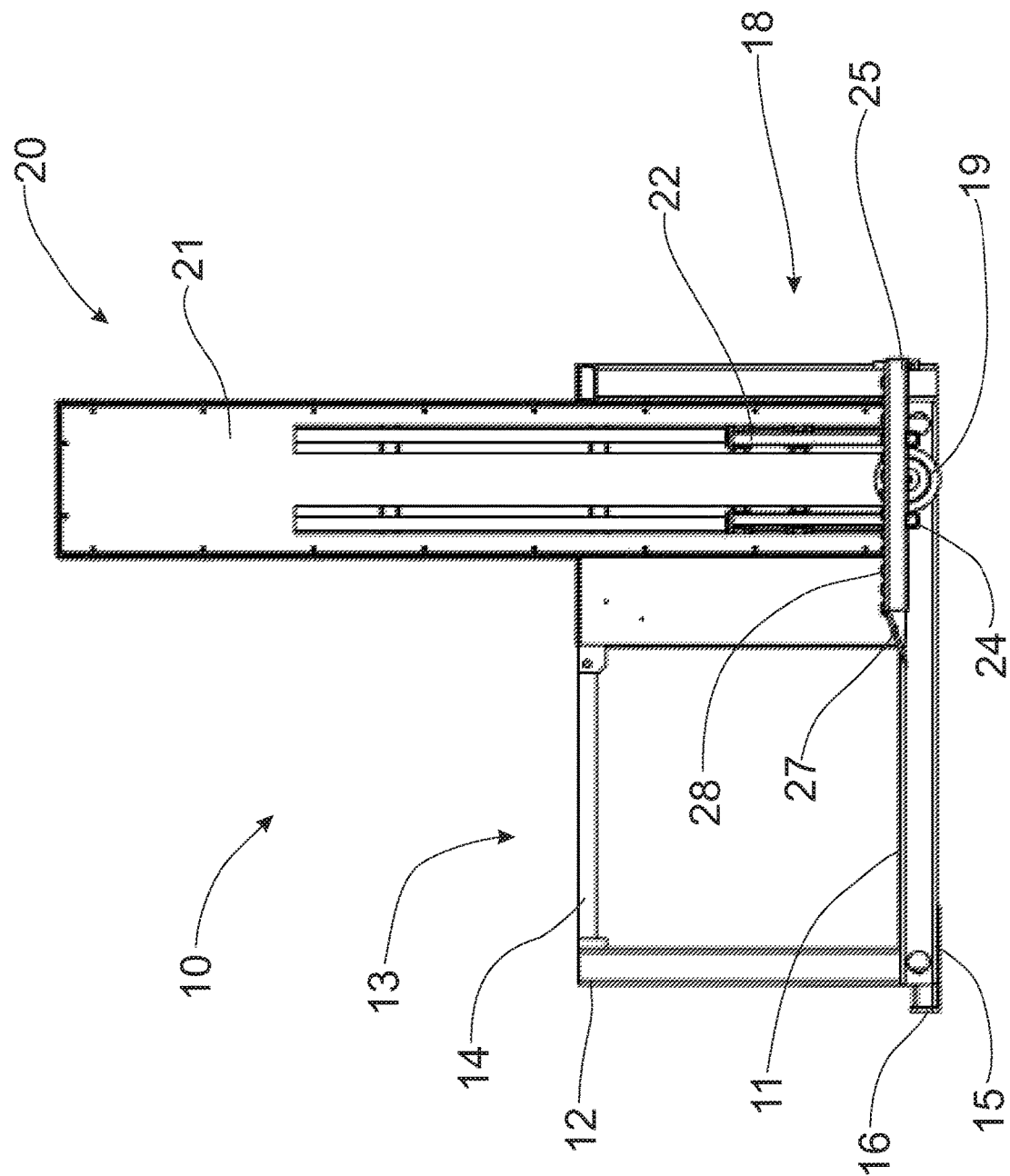

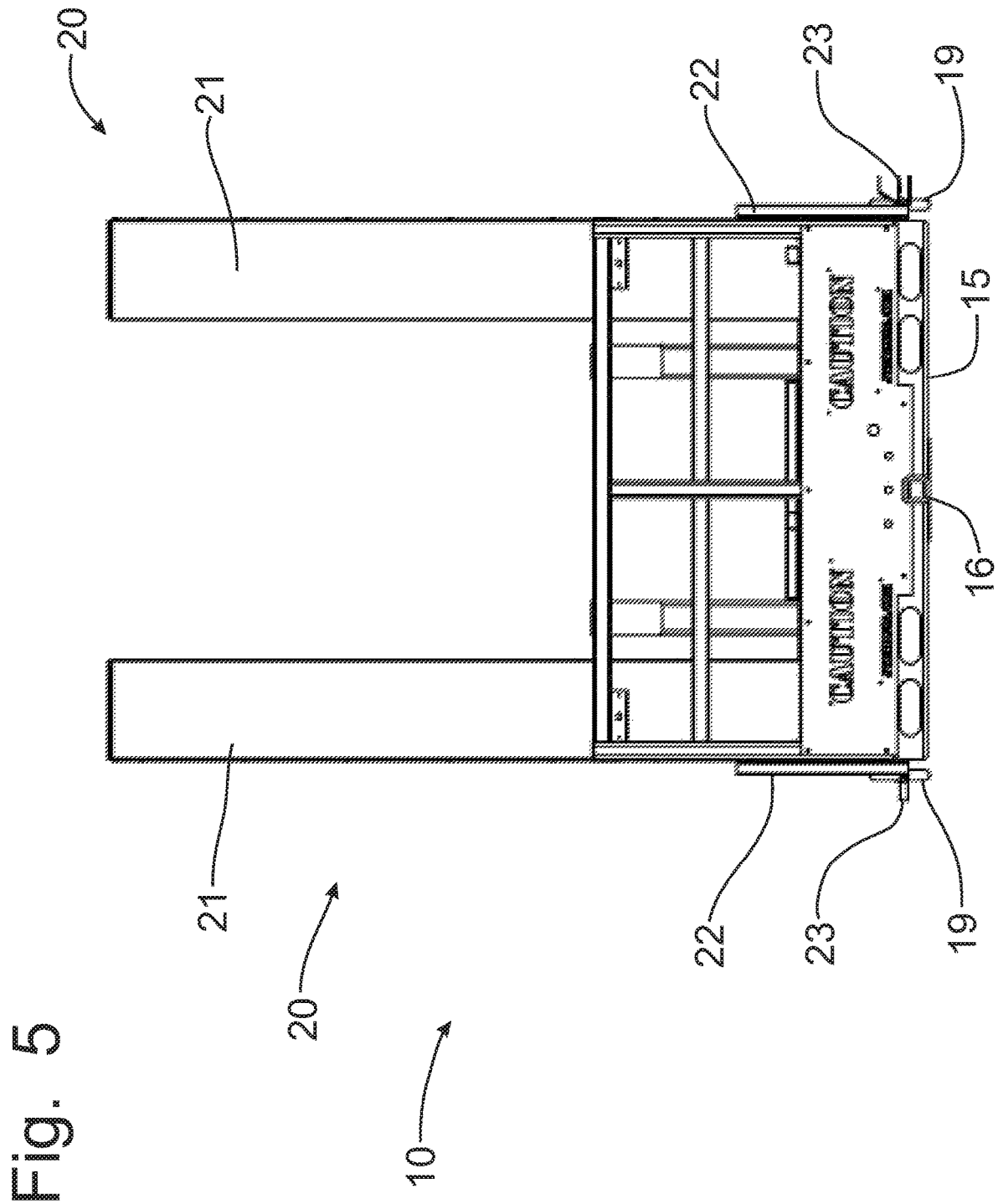

WORK BASKET WITH LIFT PLATFORM FOR DEPLOYING AND RETRIEVING HIGHWAY PANELS

CROSS-REFERENCE TO RELATED APPLICATIONS

This application claims domestic priority on co-pending U.S. Provisional Patent Application Ser. No. 62/672,994, filed on May 17, 2018, the contents are incorporated herein by reference.

FIELD OF THE INVENTION

This invention relates generally to a work basket mounted on the rear of a highway truck to facilitate the placement and retrieval of traffic control devices on highways, such as temporary highway panels, for lane closures and, more particularly, to a work basket having a vertically movable deployment platform supported on the work basket.

BACKGROUND OF THE INVENTION

The closure of lanes of traffic on highways for the purposes of highway maintenance and construction is initiated by the placement of traffic cones or highway panels onto the surface of the highway to provide an indication to the oncoming traffic that the lane is being closed to traffic. The placement of such highway markers in some locations of the country is accomplished by the placement of highway panels or plastic barrels. In other areas of the country, lane closure is initiated by the placement of traffic cones.

Whether deploying highway panels or highway cones, the devices to be deployed and later retrieved are positioned by workers that are positioned near or on the road surface to receive the devices carried on the bed of a highway truck transporting the devices for deployment. A work basket can be connected to the rear of the highway truck to position a worker near the road surface for deployment of the highway panels or cones. With a worker supported along the side of the work basket, highway panels or cones can be positioned on the surface of the highway after another worker provides the device from the bed of the highway truck. Because of the stability that is required of a work basket to carry a worker positioned along an extreme lateral side thereof, work baskets are mounted on substantial frame members of the highway truck, while directional signs giving directions to travelers are usually hauled behind other highway trucks. For larger highway control markers, vertically movable lift platforms for raising or lowering the highway control markers from the bed of the highway truck. Such lift platforms are typically mounted on the frame of the highway truck and supported and powered therefrom for vertical movement.

Mechanisms have been developed for the placement and retrieval of cone markers, as can be seen in U.S. Pat. No. 5,213,464, granted on May 25, 1993, to John Nicholson, et al, in which a rotating wheel mechanism engages the cone markers guided into the wheel mechanism by a guide member, engages the base of cone marker to invert the cone for engagement with stripper bars that remove the inverted cone marker from the elevating wheel mechanism for placement of the cone marker where the cone marker can be grasped and placed onto the truck bed. The Nicholson wheel mechanism can also be utilized to deploy the cone markers by a worker dropping the cone markers in a specified orientation into a guide device into engagement with the wheel mechanism that orients the cone markers into an upright orientation on the surface of the highway.

U.S. Pat. No. 6,056,498, granted to Steven Velinsky, et al, on May 2, 2000, provides substantially the same function as the Nicholson mechanism through the engagement of the cone marker by a guide mechanism to bring the cone marker into engagement with a lift arm that grasps the cone marker an pivotally elevates the cone marker to the level of the truck bed where the cone marker is stored manually. U.S. Pat. No. 7,306,398, issued to John Doran, Jr. on Dec. 11, 2007, discloses a more complicated arrangement for transferring cone markers from a truck onto the road surface through utilization of a placement arm.

It would be desirable to provide a smaller work basket that can be manufactured economically, while providing the ability to mount the work basket relative to the highway truck and support a lift platform that is vertically movable to deploy or retrieve highway control markers between the bed of the truck and the surface of the highway.

SUMMARY OF THE INVENTION

It is an object of this invention to overcome the aforementioned disadvantages of the prior art by providing a highway work basket that includes a vertically movable lift platform.

It is another object of this invention to provide a small highway work basket with a lift platform to facilitate the movement of highway control markers between the bed of a truck and the surface of the highway.

It is an advantage of this invention that the overall width of the work basket and lift platform is smaller than the overall width of the truck towing the work basket.

It is a feature of this invention that the frame of the work basket supports a hitch receiver for connecting a rearwardly trailing device, such as a directional sign.

It is another feature of this invention that the frame of the work basket supports a lift mechanism on opposing sides of the work basket.

It is another advantage of this invention that providing a lift mechanism on each opposing sides gives the work basket the capability of mounting a lift platform selectively on either side of the work basket.

It is still another feature of this invention that the lift platform is detachably mounted on a selected one of the laterally opposing lift mechanisms.

It is yet another feature of this invention that each of the lift mechanisms are operable to move the lift platform between an upper position at the level of the bed of the host highway truck and a lower position proximate to the level of the surface of the highway.

It is still another advantage of this invention that the vertical movement of the lift platform permits the movement of highway markers from the truck to the highway, or alternatively the retrieval of the highway markers from the highway to the level of the truck on which the work basket is mounted.

It is still another feature of this invention that the floor of the lift platform can be provided with a pair of powered conveyors embedded into the floor.

It is yet another advantage of this invention that the conveyors embedded into the floor of the lift platform can be powered hydraulically from the host highway truck on which the work basket is mounted and selectively operable to move highway markers along the floor of the lift platform.

It is still another object of this invention to provide a highway work basket that enables the combined apparatus of the highway truck and the mounted work basket to deploy and retrieve highway markers for operation in smaller, more confined situations.

It is yet another object of this invention to provide a combined highway truck and mounted work basket apparatus that has a width dimension that fits within the rearward confines of the highway vehicle, rather than located outboard of the highway vehicle as is known in the art.

It is a further feature of this invention that the operations for deployment and retrieval of highway markers in conjunction with a lift platform rising that operates behind the rear surface of the truck bed, rather than to the side of the truck bed as is known in the art.

These and other objects, features and advantages of this invention can be found by providing a highway work basket apparatus with a vertically movable lift platform that can be selectively mounted on either side of the work basket. The frame of the work basket supports a pair of lift mechanisms mounted on opposing sides at the forward end of the work basket. A detachable lift platform is provided for selective attachment to one of the opposing lift mechanism to provide the ability to move highway markers between the levels of the truck bed and the surface of the highway. The floor of the lift platform has conveyors embedded therein and powered by the hydraulics of the highway truck on which the work basket is mounted to facilitate the movement of the highway markers onto or off of the surface of the highway. The frame of the work basket also supports a hitch receiver to permit a trailing attachment of a directional sign.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is a right side elevational view of the work basket shown in FIG. 1 with lift platform positioned in a lowered position adjacent the surface of the highway; and FIG. 5 is a rear elevational view of the work basket incorporating the principles of the instant invention with the lift platform broken away for purposes of clarity, a representative host vehicle bed being shown schematically in phantom.

DETAILED DESCRIPTION OF THE PREFERRED EMBODIMENTS

Figure 1:
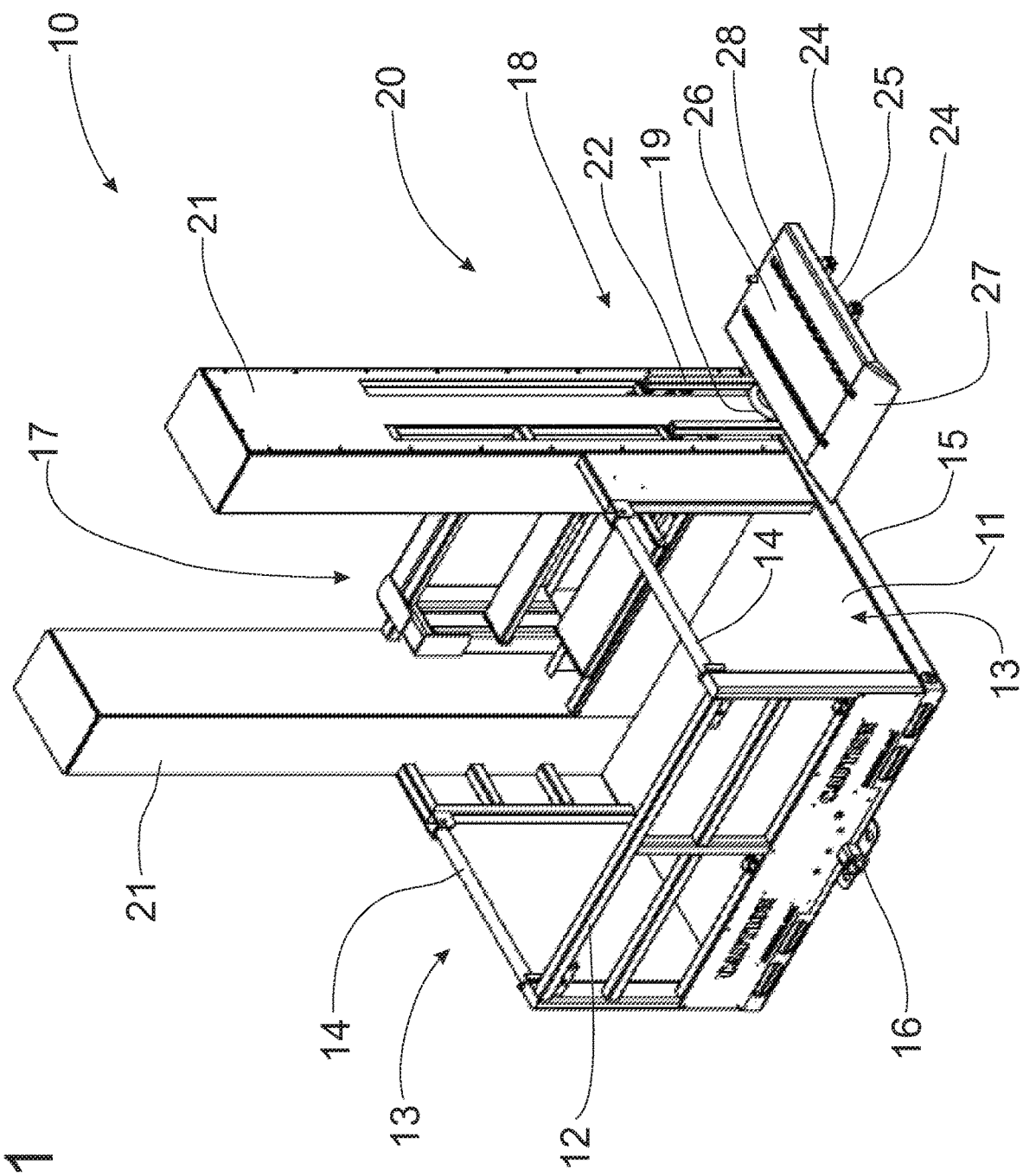
FIG. 1 is a right, rear perspective view of a work basket incorporating the principles of the instant invention, a lift platform being mounted on the right side for vertical movement relative to the floor of the work basket and the highway truck to which the work basket is mounted.
Figure 2:
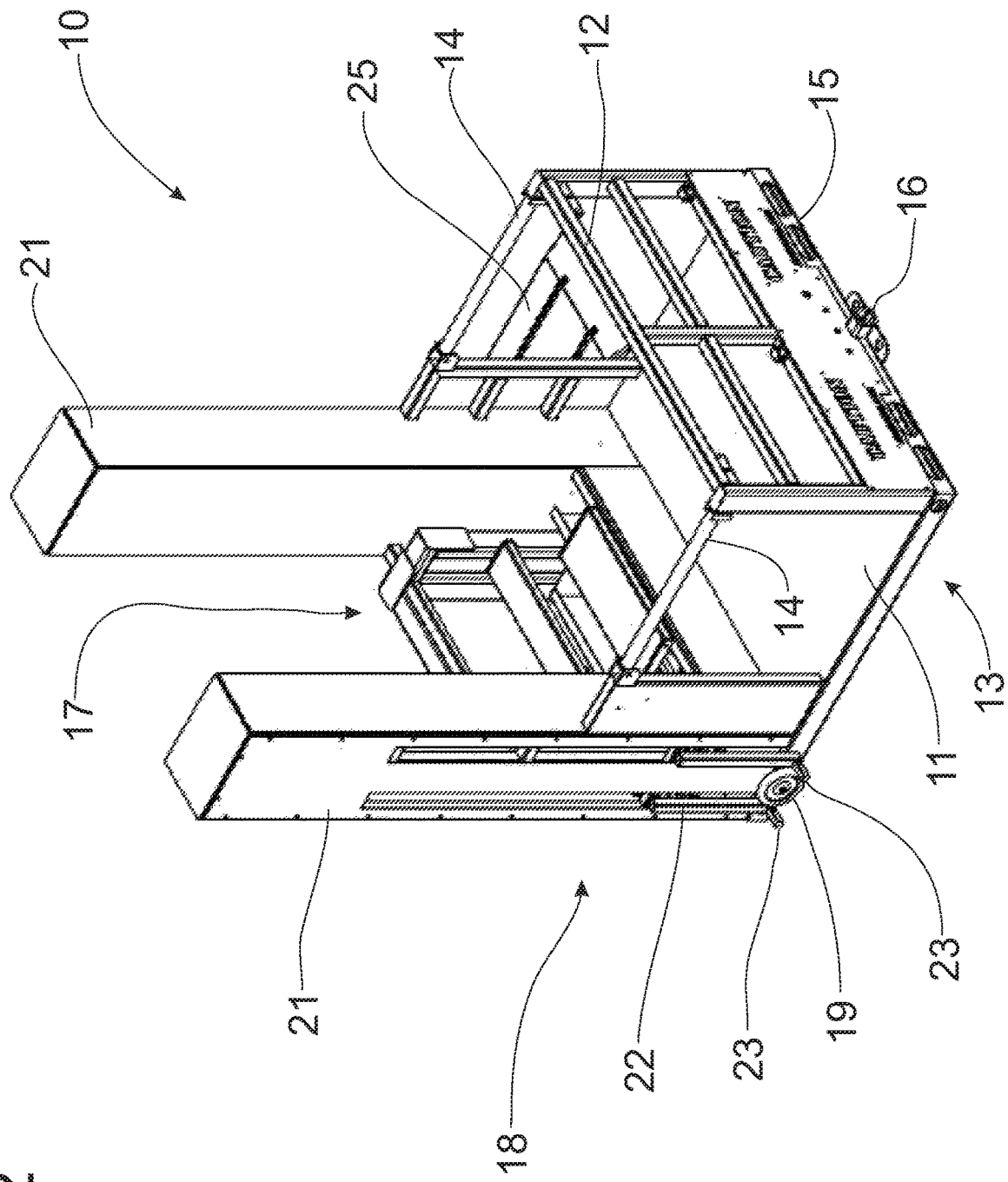
FIG. 2 is a left, rear perspective view of the work basket shown in FIG. 1.

Referring now to drawings, a work basket mountable to the hitch receiver of a host highway truck to facilitate the placement of highway cones, panels or other highway markers onto the surface of a highway to identify construction zones and incorporating the principles of the instant invention can best be seen. References to left and right, as well as front and rear can be determined from reference to the truck on which the work basket is mounted standing at the rear of the truck facing the front of the truck in the normal forward direction of travel of the vehicle. One skilled in the art will understand that a decking material, such as pooched metal sheeting, would typically cover the floor of the work basket.

The work basket 10 can be hitch mounted to the hitch receiver on the host highway truck at the rearward end thereof, or through a lift linkage that enables the work platform to be raised and lowered relative to the bed of the host highway truck, to provide a work station from which workers can manipulate the highway cones, panels or other highway markers between the truck and the surface of the highway. In the work basket configuration shown in the drawings, the work basket 10 is provided with a hitch (not shown) that connects with a hitch ball connected to the hitch receiver of the host highway truck. The work basket 10 is formed as a platform floor 11 that is provided with a fence railing 12 around the perimeter thereof. The frame 15 also supports a hitch receiver 16 at the rearward end of the work basket 10 to provide selective, optional connection of a directional sign to the work basket 10 to trail behind the work basket 10 during operation. A pair of opposing stabilizing wheels 19 is mounted on opposing sides of the forward end of the work basket 10 to keep the frame level during operation thereof.

The fence railing 12 has two openings 13 therein on the opposing lateral sides of the work basket 10 through which workers can access the surface of the highway. Each opening 13 is closed by a safety gate 14 whether or not the opening is being utilized to deploy traffic cones to the highway. The work basket 10 is formed with a frame 15 that supports the platform floor 11 and the mounting mechanism 18 at the forward end of the work basket 10. The frame 15 also supports a set of steps 17 in the forward end of the work basket 10 to facilitate ingress and egress of workers between the bed of the host highway truck H and the floor 11 of the work basket 10.

Preferably, the frame 15 also supports a lift platform apparatus 20, including a pair of subframes 21 extending vertically on opposing sides of the forward end of the work basket 10. The subframes 21 support a lift mechanism 22 that is powered by the hydraulic system of the host highway vehicle (not shown) to affect vertical movement of the lift platform 25 that is selectively attached to the lift mechanism 22. In operation, the lift mechanism 22 will selectively move the lift platform 25 between an upper position at the level of the bed of the host highway truck and a lower position proximate to the level of the surface of the highway to permit the movement of highway markers from the truck to the highway, or alternatively with the retrieval of the highway markers from the highway to the level of the truck.

The lift platform 25 is detachable from the mounting members 23 of the lift mechanism 22 so that the lift platform 25 can be utilized in a selective manner on opposing sides of the work basket 10, depending on which side of the work basket 10 is being used to deploy or retrieve the highway markers. The lift platform 25 includes support members 24 that detachably connect to the mounting members 23 and permit the vertical movement of the lift platform 25 with the lift mechanism 22. The lift platform also includes a generally planar floor 26 having a trailing ramp member 27 to ease highway markers between the floor member 26 and the surface of the highway. Preferably, the floor 26 is provided with a pair of conveyors 28 embedded into the floor 26, but preferably powered hydraulically from the host highway truck (not shown) and selectively operable to move highway markers along the floor 26 of the lift platform.

In operation, the forward mounting mechanism 18 on the work basket 10 is mounted to the appropriate hitch or linkage on the rear of the host highway truck (not shown) which can carry a plurality of highway markers to be deployed, or alternatively, the highway markers to be retrieved from the highway. The lift platform mechanism 20 is then connected to the mounting members 23 on the side of the work basket 10 to be utilized in the deployment or retrieval of the highway markers. The host highway vehicle having the work basket 10 mounted to the rearward end thereof is then taken to the job site.

For deployment of highway markers, an operator operates the lift mechanism 22 to position the lift platform 25 in the upper position at the level of the bed of the host highway vehicle where a highway marker is placed onto the floor 26 of the lift platform 25. The operator then operates the lift mechanism 22 to lower the lift platform 25 to the lower position adjacent the surface of the highway. The conveyors 28 are then operated to move the highway marker across the floor 26, down the ramp portion 27 and onto the surface of the highway. Once deployed, the lift platform 25 is returned to the upper position and the process repeated.

Retrieval of the highway markers is essentially the opposite operation. The host vehicle is backed to position the lift platform 25 next to the highway marker to be retrieved. The forward end of the highway marker is lifted slightly to enable the ramp portion 28 to move under the highway marker whereupon the combination of the rearward motion of the lift platform 25, as induced by the movement of the host highway vehicle, and the operation of the conveyors 28, results in the positioning of the highway marker on the floor 26 of the lift platform 25. The operator then operates the lift mechanism 22 to raise the lift platform to the upper position where the conveyors 28 can be utilized to move the highway marker onto the bed of the truck for transportation to a remote location. Once the highway marker is removed, the lift platform can be returned to the lower position and the process repeated.

Figure 3:
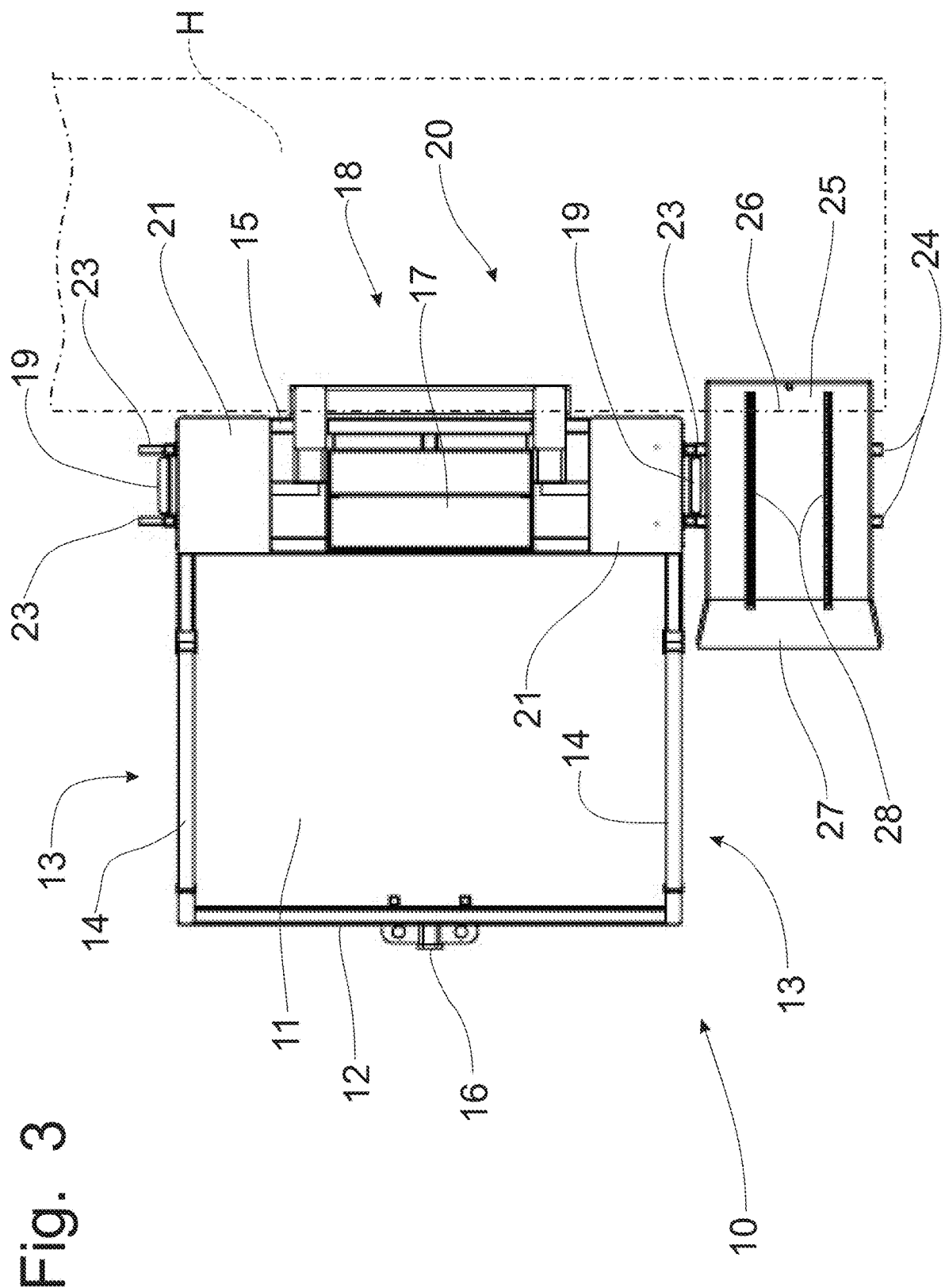
FIG. 3 is a top plan view of the work basket shown in FIG. 1, a representative host vehicle bed being shown schematically in phantom.

One significant feature of the work basket 10 incorporating the principles of the instant invention is that the overall width of the work basket 10, including the lateral width added by the mounting of the lift platform 25, irrespective of which side of the work basket 10 the lift platform 25 is mounted, is less than, or equal to, the overall width of the bed of the host highway vehicle H shown schematically in FIGS. 3 and 5. This unique configuration of the work basket 10 enables the combined apparatus for deploying and retrieving highway markers, i.e. the host highway vehicle and the attached, trailing work basket and lift platform, to be operated in smaller situations because the lift platform 25 is placed within the rearward confines of the host highway vehicle, rather than located outboard of the host highway vehicle as is known in the art. Therefore, the operations for deployment and retrieval of highway markers described above result in the lift platform rising to the upper position at the level of the truck bed, behind the rear surface of the truck bed, rather than to the side of the truck bed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A work basket mountable to the rearward end of a host highway vehicle for deploying and retrieving highway panels between a bed of the host highway vehicle and a highway surface, comprising:
   a frame selectively connectable to said rearward end of said host highway vehicle for movement therewith;
   a floor supported on said frame for receiving workers thereon;
   a pair of opposing vertically oriented subframes supported on said frame and housing in each respective said subframe a lift mechanism movable along a vertical path, said lift mechanisms being movable with the host highway vehicle;
   a lift platform selectively detachably connectable to a selected one of said lift mechanisms such that said lift platform is vertically movable in a linear path with the corresponding lift mechanism from an upper position at a level of said bed and a lower position proximate to said highway surface, said host highway vehicle having a width dimension at a rearward end thereof, said work basket and connected lift platform having a corresponding width dimension that is less than or equal to said width dimension of said rearward end of said host highway vehicle.

2. The work basket of claim 1 wherein said corresponding width dimension of said work basket and said connected lift platform is less than or equal to said width dimension of said rearward end of said host highway vehicle irrespective of the selected lift mechanism to which the lift platform is attached.

3. The work basket of claim 2 wherein said lift platform includes a floor member embedded with a conveyor mechanism to facilitate the movement of said highway markers between said lift platform and the surface of the highway.

4. The work basket of claim 3 wherein said conveyor mechanism is powered via a hydraulic system on said host highway vehicle.

5. The work basket of claim 3 wherein said conveyor mechanism comprises two conveyor members spaced apart of the floor member of the lift platform.

6. The work basket of claim 2 wherein said frame supports a hitch receiver accessible from a rearward side of said frame for connection to a trailing implement.

7. A work basket mountable to the rearward end of a host highway vehicle for deploying and retrieving highway panels between a bed of the host highway vehicle and a highway surface, comprising:
   a frame selectively connectable to said host highway vehicle for movement therewith;
   a floor supported on said frame for receiving workers thereon;
   a pair of opposing vertically oriented subframes supported on said frame and housing in each respective said subframe a vertical lift mechanism operable along a linear path, said lift mechanisms being movable with the host highway vehicle;
   a lift platform selectively detachably connectable to a selected one of said lift mechanisms such that said lift platform is vertically movable along said linear path from an upper position at a level of said bed and a lower position proximate to said highway surface, said floor, subframes and said lift platform defining a lateral width dimension of said work basket, said lateral width dimension being less than or equal to a corresponding width dimension of a rearward end of said host highway vehicle, whereby said highway panels are moved onto said lift platform from the rear of the host highway vehicle and deposited onto the highway within the width dimension of said host highway vehicle.

8. The work basket of claim 7 wherein said lateral width dimension is less than or equal to said corresponding width dimension of said rearward end of said host highway vehicle irrespective of the selected lift mechanism to which the lift platform is attached.

9. The work basket of claim 7 wherein said frame supports a hitch receiver accessible from a rearward side of said frame for connection to a trailing implement.

10. The work basket of claim 7 wherein said lift platform includes a floor member embedded with a conveyor mechanism to facilitate the movement of said highway markers between said lift platform and the surface of the highway.

11. The work basket of claim 10 wherein said conveyor mechanism is powered via a hydraulic system on said host highway vehicle.

12. The work basket of claim 11 wherein said conveyor mechanism comprises two conveyor members spaced apart of the floor of the lift platform.

13. A work basket mountable to the rearward end of a host highway vehicle for deploying and retrieving highway panels between a bed of the host highway vehicle and a highway surface, comprising:
 a frame;
 a floor supported on said frame for movement of workers thereon;
 a pair of opposing vertically oriented subframes supported on said frame and housing in each said subframe a vertical lift mechanism movable along a linear path along the corresponding said subframe; and
 a lift platform selectively detachably connectable to a selected one of said lift mechanisms such that said lift platform is vertically movable along said linear path from an upper position at a level of said bed and a lower position proximate to said highway surface, said floor, subframes and said lift platform defining a lateral width dimension of said work basket, said lateral width dimension being less than or equal to a corresponding width dimension of a rearward end of said host highway vehicle, whereby said highway panels are moved onto said lift platform from the rear of the host highway vehicle and deposited onto the highway within the width dimension of said host highway vehicle, said lift platform having a floor member embedded with a conveyor mechanism to facilitate movement of said highway panels between said lift platform floor member and said highway surface.

14. The work basket of claim 13 wherein said conveyor mechanism is powered via a hydraulic system on said host highway vehicle.

15. The work basket of claim 14 wherein said conveyor mechanism comprises two conveyor members spaced apart of the floor of the lift platform.

16. The work basket of claim 13 wherein said frame supports a hitch receiver accessible from a rearward side of said frame for connection to a trailing implement.

17. The work basket of claim 13 wherein said lateral width dimension is less than or equal to said corresponding width dimension of said rearward end of said host highway vehicle irrespective of the selected lift mechanism to which the lift platform is attached.

* * * * *